Aug. 3, 1965   G. K. FARMERY ETAL   3,198,586
DUAL CONTROL VALVE FOR VEHICLE BRAKE SYSTEMS
Filed June 19, 1962   3 Sheets-Sheet 1

INVENTORS
GEORGE K. FARMERY
WILBUR M. PAGE

By: Norris & Bateman

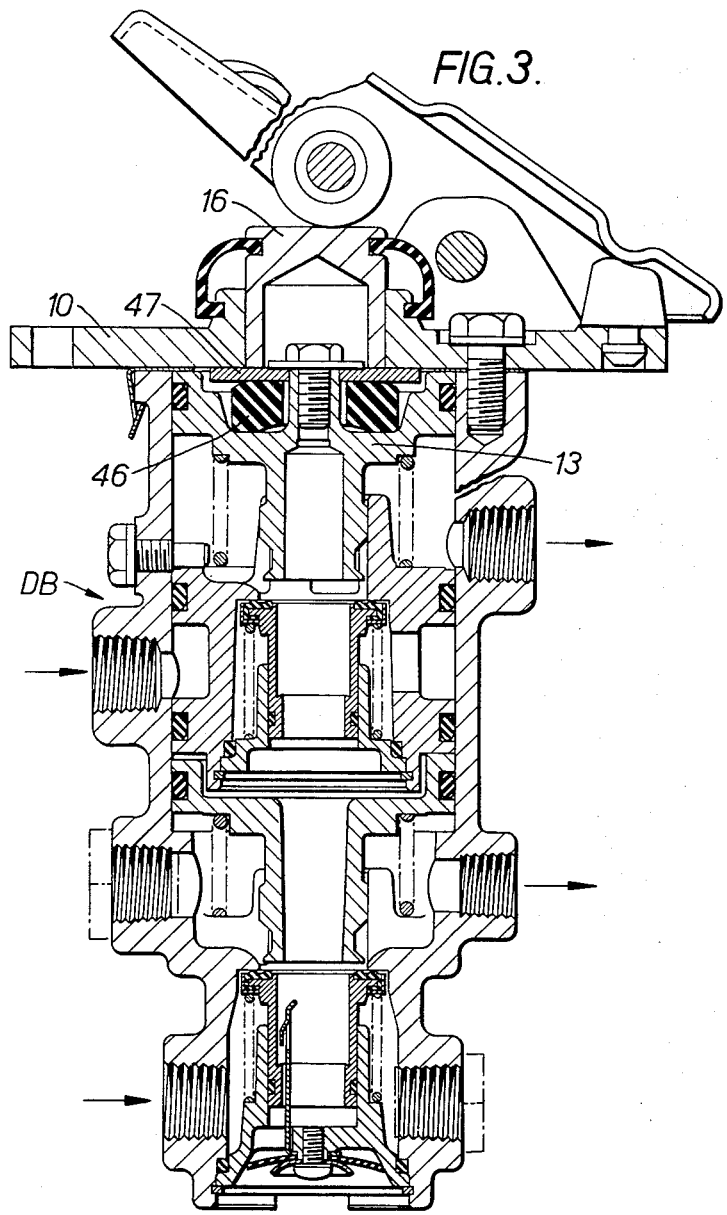

United States Patent Office 3,198,586
Patented Aug. 3, 1965

3,198,586
DUAL CONTROL VALVE FOR VEHICLE
BRAKE SYSTEMS
George K. Farmery and Wilbur M. Page, Lincoln, England, assignors to Clayton Dewandre Company Limited, Lincoln, England, a British company
Filed June 19, 1962, Ser. No. 203,608
Claims priority, application Great Britain, June 26, 1961, 23,016/61
2 Claims. (Cl. 303—52)

This invention relates to fluid pressure-operated braking apparatus for motor vehicles and particularly to air pressure-operated apparatus comprising two independent systems actuating separate sets of brakes, the main object of the invention being the provision of an improved form of dual brake valve for controlling the two systems and which, in the event of a failure in either system, ensures the continued operation of the other.

A more specific object of the invention is the provision of an improved and simplified form of dual control valve which keeps to a minimum pressure differences in the two braking systems, which will "crack-off" under a relatively low force and which has other operational advantages as will appear hereafter.

According to the invention the improved dual control valve comprises a housing or cylinder embodying two sets of ports each consisting of an air supply port and an air delivery or service port, primary and secondary piston structures disposed in spaced relation within said cylinder, means for transmitting the thrust of a foot pedal or other manual effort to the primary piston structure and, through the latter, to the secondary piston structure, valve elements normally sealing off the air supply ports whilst connecting the service ports to exhaust, and valve-actuating members on the piston structures operable when the latter are displaced to actuate the valve elements to seal off the exhaust connections and connect the air supply ports to their respective service ports, said valve elements and said valve-actuating members being so formed as to provide collectively an axially-disposed exhaust passage common to the two brake systems.

Figure 1:
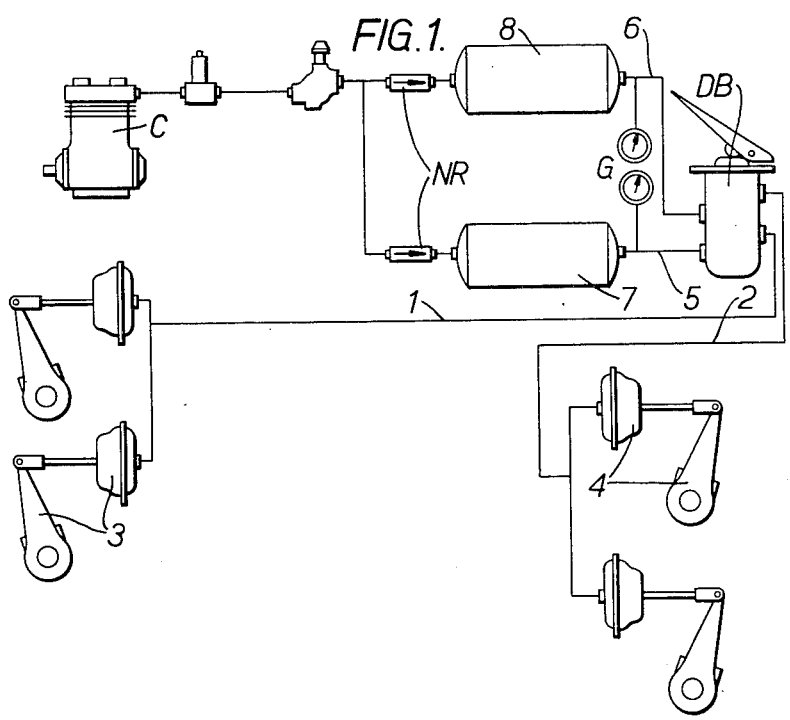
Figure 2:
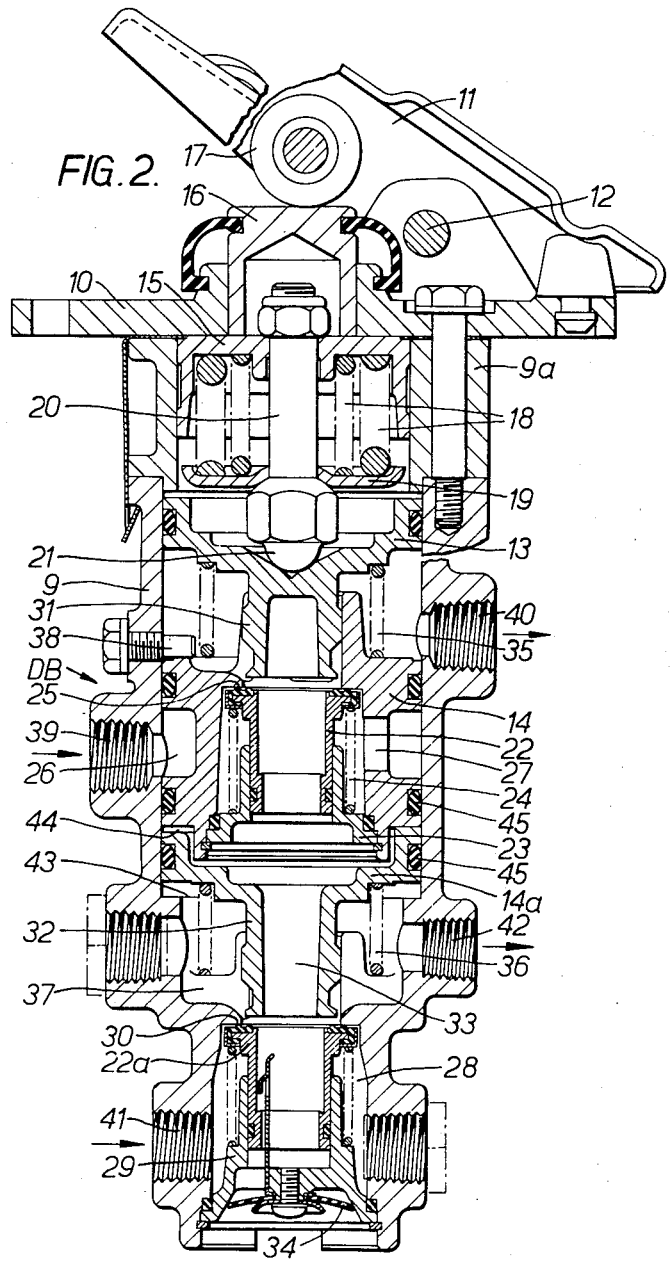

Reference will now be made to the accompanying drawings which illustrate by way of example two embodiments of the invention and wherein:

FIG. 1 shows diagrammatically a braking system of the type in which the improved brake valve is employed, FIG. 2 is an axial section through a first form of the valve, and FIG. 3 is a similar view of a second form of the valve.

Referring first to FIG. 1, it will be seen that the basic system comprises the dual brake valve DB the two service ports of which are connected by conduits 1, 2 to independent front and rear braking systems 3, 4 respectively, the air supply ports of said valve being connected by conduits 5, 6 to their respective reservoirs 7, 8 charged by a common compressor C past non-return valves NR.

Referring now to the embodiment of the invention shown in FIG. 2, it will be seen that the valve comprises a substantially cylindrical housing 9 adapted to be supported in a vertical position by being bolted at its upper end to a mounting plate 10 upon which a foot treadle 11 is pivoted at 12. Disposed within the housing in spaced relation are a one-piece primary piston 13 and a two-part secondary piston 14, 14a, the primary piston uppermost, and located above piston 13 are means for exerting a downward thrust thereon when the treadle is depressed. In this form of the invention said means includes a capping member 15 slidable in an upper housing extension 9a, a plunger 16 displaceable in a bore in the mounting plate 10 and bearing at its lower end upon the capping member 15 whilst at its upper end it is engaged by a roller-type abutment 17 on the foot treadle, and a graduating spring assembly 18 interposed between the member 15 and an apertured plate 19 seated on the head of a thrust pin 20 which has a ball and socket type connection 21 with the head of piston 13. The springs 18 which transmit the thrust of the foot pedal to the piston 13 and which may be substituted by a single spring if desired enable progressive control of the power braking to be achieved.

The upper component 14 of the secondary piston structure is provided with an axial bore within which is disposed a tubular valve element 22, said element being supported for axial sliding movement by a valve guide 23 secured within the lower end of the axial bore and being urged by a spring 24 into engagement at its upper end with a downwardly-directed annular seating 25 formed on said piston component. In addition, the piston component 14 is shaped to define two spaced lands separated by a peripheral chamber 26 which communicates with the axial bore by way of a port 27. A similar valve element 22a is disposed within a chamber 28 in a lower end extension of the housing, said element being supported in a fixed valve guide 29 and, in this instance, being spring urged into engagement at its upper end with a downwardly-directed annular seating 30 formed on an inwardly-projecting portion of the housing.

The primary piston 13 is provided on its underside with a coaxial stem 31 constituting a valve-actuating element which is normally spaced a slight distance from the upper end of valve element 22 as shown. A similar valve-actuating stem 32 on the underside of piston component 14a is positioned in like manner in relation to valve element 22a, the stem portion 32, which is tubular, the valve elements 22, 22a and the associated valve guides 23, 29 defining an axial exhaust passage 33 opening to atmosphere at its lower end past a check valve 34. The primary piston 13 is loaded by a return spring 35 acting between said piston and the piston component 14 whilst the secondary piston structure is loaded by a return spring 36 interposed between the underside of piston component 14a and a fixed abutment 37 on the housing, upward movement of the secondary piston structure being limited by engagement with a stop 38 in the housing wall.

To interconnect the brake valve into the two braking systems to be controlled, an air supply port 39 for connection to conduit 6 is provided in the housing wall and opening into the annular chamber 26 in the piston component 14 whilst the related service port 40 is located in the housing wall at a level between piston 13 and piston component 14. The air supply port 41 for connection to conduit 5 is positioned below the fixed seating 30 engaged by the lower valve element 22a, the related service port 42 being positioned immediately above said seating. The air delivery and service ports may each be duplicated at the opposite side of the housing, ports 41 and 42 are shown duplicated by way of example, to facilitate installation of the brake valve, it being understood that ports not in use are plugged.

The brake valve operates as follows:

In the inoperative or "brakes off" position as shown, the valve elements 22, 22a engage their seatings 25, 30 and seal off the air supply ports, but as the lower ends of the piston stems 31, 32 are spaced a short distance from the valve elements, communication between the service ports 40, 42 and the exhaust passage 33 is permitted. As the treadle 11 is depressed, a force is transmitted through the pressure graduating springs 18 and moves the primary piston 13 downwards. The stem 31 on this piston laps onto the valve element 22, closing the connection between the service port 40 and the central exhaust passage and, under continued movement of the piston, moves said valve element off its seating 25.

Air under pressure now flows from the supply port 39 to the service port 40 and so to the rear brake cylinders. As pressure builds up above piston 14, 14a, this piston is also depressed so that the valve element 22a is also moved from its seating to connect the front wheel brakes in like manner to the air supply. It will be noted that under these conditions, the air pressure on the underside of the primary piston 13 acts in opposition to the manual effort exerted through spring assembly 18, thus creating a reactive force which is felt at the treadle.

When the pressure on the underside of the secondary piston 14, 14a equals that acting on the upper side of said piston, the latter rises until valve element 22a re-engages its seating 30 to cut off further supply of compressed air from port 41 and the front wheel braking system attains a balanced condition. Similarly, when the air pressure beneath the primary piston 13 attains a value sufficient to overcome the mechanical force exerted on the top of the piston, said piston also rises until a balanced condition also exists in the rear wheel braking system. At this stage, the piston stems will remain in contact with the valve elements to prevent loss of air to the exhaust passage whilst a further depression of the driver's treadle will reopen the valves to increase air pressure to the brakes. When, however, the treadle is released, not only do both valve elements re-engage their seatings but both piston structures move upward under the action of their return springs to disengage the piston stems from the valve elements and so re-connect the brake lines to the exhaust passage.

Should the driver make a heavy rapid brake application, the pressure graduating spring or spring assembly is compressed and the secondary piston follows the movement of the primary piston until it is arrested by a stop 43 on the housing, in which position both brake systems are fully open to reservoir pressure.

It will be appreciated that with the arrangement above described a failure in the secondary system will result in the primary piston continuing to function in the manner of a single element brake valve. On the other hand, if the primary system fails, the primary piston will be moved downward by the treadle into abutment with the secondary piston and will actuate it directly to operate the secondary controlled system.

A feature of the two-part secondary piston is that the division between the two components 14, 14a is located between the two bottom piston seals 45, a slight clearance 44 being maintained between said piston components which is in permanent communication with the central exhaust passage. Thus, if either of the two seals 45 were to fail, air pressure would be lost from only one braking system and the 50% drop in available braking power would act as a warning to the driver.

The use of a floating secondary piston not only keeps pressure differences between the two systems to a minimum but it reduces valve "crack-off" in that the force required to crack the primary valve is transmitted by reaction to the secondary valve, that is, the two valves are cracked by the same force as is normally required to crack one valve. The use of partially balanced valves increases the degree of sensitivity whilst other advantageous features of the improved valve are simplicity of construction with low manufacturing costs and the vertical straight through exhaust passage minimizing trapping and freezing of moisture at low temperatures.

The ball and socket connection 21 between the thrust pin and piston 13, and the equivalent connection between the thrust plate 19 and the head of said pin, avoids side thrust being transmitted to the piston 13 due to use of a pressure graduating spring which is "out of square." Another construction which also avoids imparting side thrust to the primary piston is shown in FIG. 3 where the pressure graduating spring is substituted by a block 46 of rubber or like resilient material and which, by distortion under compression, gives the required "travel" characteristic. As shown, the housing extension 9a of FIG. 2 is dispensed with, the piston 13 being normally located close up beneath the mounting plate 10. The downward thrust of the plunger 16 is transmitted through a plate 47 to the rubber block which is located in a recess in the upper side of piston 13, the remainder of the valve following the construction and mode of operation as described above with reference to FIG. 2.

Finally, it will be understood that instead of actuating the brake valve directly by the foot treadle as shown, the plunger 16 could be depressed by a lever or equivalent means actuated by a remotely situated foot pedal or the like.

What we claim is:

1. A dual control valve for a vehicle braking system that comprises an actuator adapted to be selectively controlled by the operator and at least two independent sets of wheel brakes, comprising a housing having two separate inlets adapted to be connected to independent sources of fluid pressure, and two separate outlets adapted to be connected to the individual wheel brake sets, a primary piston slidably mounted in said housing, a secondary piston assembly slidably mounted in said housing coaxially with the primary piston, means providing a first passage from one of said inlets through said secondary piston assembly to one of said outlets, a first tubular valve element slidably mounted on said secondary piston assembly and normally closing said first passage, means providing a second passage in said housing from the other of said inlets to the other of said outlets, a second tubular valve element slidably mounted in said housing and seated for normally closing said second passage, means providing an operative connection between said actuator and said primary piston whereby when the operator shifts said actuator the primary piston is displaced to engage and move said first valve element to open said first passage, means responsive to said displacement of the primary piston for displacing said secondary piston assembly to engage and move said second valve element to open said second passage, said secondary piston assembly comprising two axially separate structurally distinct components with said first passage being formed through that one of said components which carries said first valve element, and the other of said components being adapted to engage and move said second valve element, surface means in said housing, said secondary piston assembly and said first and second valve elements defining an exhaust passage extending through said secondary piston assembly and both of said tubular valve elements, means in said housing defining an exhaust port at one end of said exhaust passage for discharging fluid from said exhaust passage, said exhaust passage being normally in fluid communication with said outlets when said valve elements are in passage closed position, said primary piston cooperating with said first valve element to close communication between said first outlet and said exhaust passage when said first passage is opened to admit fluid pressure to said first outlet, and said secondary piston assembly cooperating with said second valve element to close communication between said second outlet and said exhaust passage when said second passage is opened to admit fluid pressure to said second outlet.

2. A dual control valve for a vehicle braking system that comprises an actuator adapted to be selectively controlled by the operator and at least two independent sets of wheel brakes, comprising a housing having two separate inlets adapted to be connected to independent sources of fluid pressure, and two separate outlets adapted to be connected to the individual wheel brake sets, a primary piston slidably mounted in said housing, a secondary piston assembly slidably mounted in said housing, means providing a first passage from one of said inlets through said secondary piston assembly to one of said outlets, a first movable valve element within said housing normally closing said first passage, means providing a second passage in said housing from the other of said inlets to the other of said outlets, a second movable valve element seated for normally closing said second passage, means providing an operative connection between said actuator and said primary piston whereby when the operator shifts said actuator the primary piston is displaced to engage and move said first valve element to open said first passage, means responsive to said displacement of the primary piston for displacing said secondary piston assembly to displace said second valve element to open said second passage, surface means in said housing defining an exhaust passage extending axially through said secondary piston assembly and terminating at one end at an exhaust port for discharging exhaust passage fluid from said housing, said exhaust passage being normally in fluid communication with said outlets when said valve elements are in passage closed position, said primary piston cooperating with said first valve element to close communication between said first outlet and exhaust when said first passage is opened to admit fluid pressure to said first outlet, said secondary piston assembly cooperating with said second valve element to close communication between said second outlet and said exhaust when said second passage is opened to admit fluid pressure to said second outlet, said secondary piston assembly comprising two separable components one of which carries said first valve element and the other of which is adapted to engage said second valve element, and said operative connection comprising means on said primary piston adapted to engage and move said first valve element when said actuator is operated, said components defining a space between them permanently connected to said exhaust passage and separate sealing means between each component and said housing at opposite sides of said space whereby failure of either one of said sealing means will adversely affect only one of said brake sets, said first inlet being located on the side of said sealing means for said primary piston that is opposite from said space, and said second inlet being located on the side of said sealing means for said secondary piston assembly that is opposite from said space.

References Cited by the Examiner

UNITED STATES PATENTS

| 1,598,798 | 9/26 | Aikman | 303—54 |
| 2,380,663 | 7/45 | Middleton | 303—54 |
| 2,752,947 | 7/56 | Hruska | 303—54 X |
| 3,003,825 | 10/61 | Kemble | 303—54 |

FOREIGN PATENTS

| 732,959 | 6/55 | Great Britain. |
| 798,816 | 7/58 | Great Britain. |

EUGENE G. BOTZ, *Primary Examiner.*

ARTHUR L. LA POINT, *Examiner.*